Figure 1:
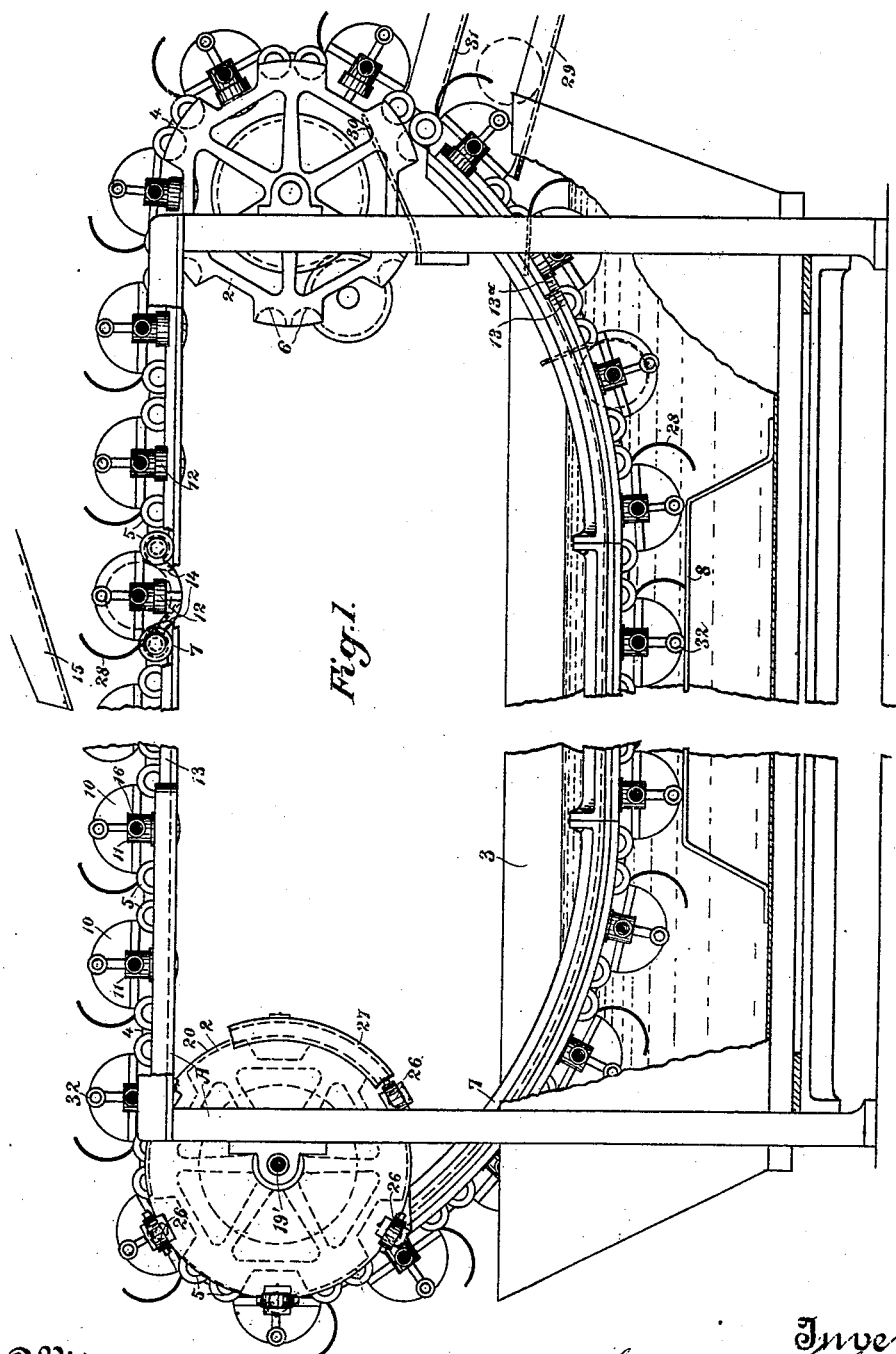

No. 683,679. Patented Oct. 1, 1901.
W. S. CASE.
CAN TESTING MACHINE.
(Application filed May 29, 1901.)
(No Model.) 2 Sheets—Sheet 1.

No. 683,679. Patented Oct. 1, 1901.
W. S. CASE.
CAN TESTING MACHINE.
(Application filed May 29, 1901.)
(No Model.) 2 Sheets—Sheet 2.
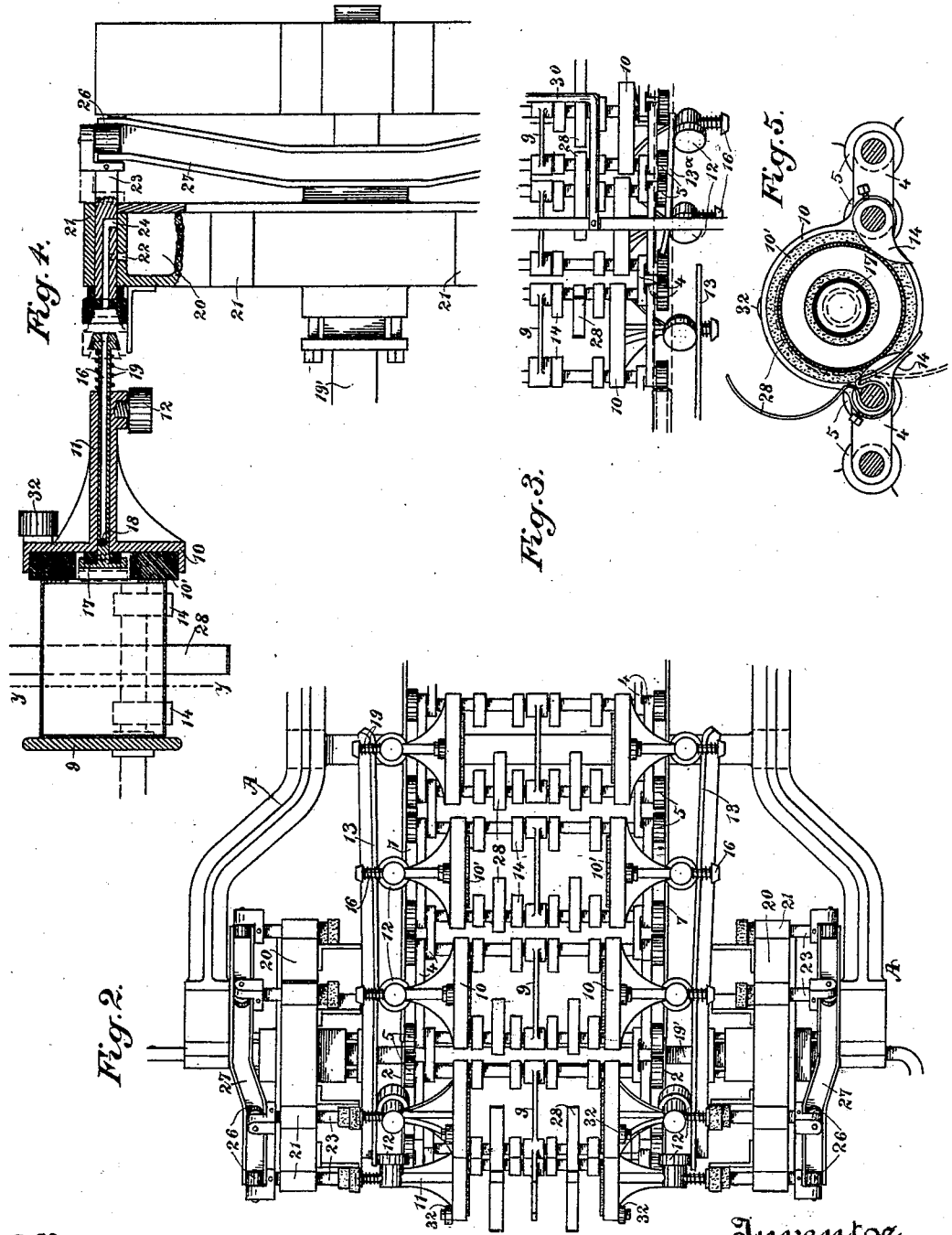

UNITED STATES PATENT OFFICE.

WILMER S. CASE, OF HAYWARDS, CALIFORNIA.

CAN-TESTING MACHINE.

SPECIFICATION forming part of Letters Patent No. 683,679, dated October 1, 1901.

Application filed May 29, 1901. Serial No. 62,339. (No model.)

*To all whom it may concern:*

Be it known that I, WILMER S. CASE, a citizen of the United States, residing at Haywards, county of Alameda, State of California, have invented an Improvement in Can-Testing Machines; and I hereby declare the following to be a full, clear, and exact description of the same.

My invention relates to improvements in machines for testing the seams of cans after they have left the soldering-machine to determine if such seams are air-tight.

It consists, essentially, of an endless conveyer having clamping devices between which the cans to be tested are received, an air-reservoir revoluble in unison with the pulleys carrying the conveyer, connections of this reservoir with said clamps whereby air under pressure is admitted to the cans, a fluid-containing trough through which the conveyer passes during a portion of its travel, and means for holding the imperfect cans in said conveyer and delivering them separately from the perfect cans.

It also comprises details of construction, which will be more fully hereinafter set forth, having reference to the accompanying drawings.

Figure 1 is a side elevation of the machine. Fig. 2 is a plan view of the feed end of the machine. Fig. 3 is a similar view showing the sagging portion leaving the trough. Fig. 4 is a longitudinal section through the air-supplying device. Fig. 5 is a section on line *y y* of Fig. 4.

A represents a suitable framework supporting the apparatus.

2 represents pulleys or sprockets over which the endless conveyer carrying the cans passes. These sprockets are disposed in relation to each other and to the length of the conveyer in such manner that the latter sags considerably below a line tangential to the lowermost points on the peripheries of said sprockets.

3 is a horizontal liquid-containing trough through which the sagging portion of the conveyer is adapted to travel.

The conveyer is made with links or bars 4, connected by the pivots or transverse rods 4ª. Upon the ends of these pivot-rods are rollers 5, which are adapted to fit the recesses 6 on the sprockets and to support the conveyer on the guides 7 during its travel. Rollers 32 sustain the conveyer on the track 8 in the bottom of the trough.

The cans are supposed to be seamed and to have one head in position, and through the open end of the can air is admitted under pressure.

I have shown my machine as adapted to handle a continuous double row of cans; but it is understood the construction may be modified so the conveyer will carry but a single row.

Fixed to and spanning the pivot-rods 4ª and central of each link are the clamp-plates 9. Upon either side of these fixed plates are the clamp members 10, slidably supported upon the rods 4ª. Each member 10 is provided with an annular rubber face 10', which is intended to seal the open end of the can when the latter is in position between clamps 9 and 10. Upon each pivot-rod are the adjustable curved can-supports 14, which prevent the can dropping through when received from the chute 15. By adjusting the supporting-arms 14 on the rods cans of various diameters may be handled by the same machine.

Upon each clamp member 10 is an outwardly-extending projection 32ª, which carries a roller 32. The conveyer is sustained by these rollers upon the track 8 in the bottom of the trough.

A horizontal hollow projection 11 is formed on each of the sliding clamps, and on each projection is a downward extension carrying a roller 12. The contact of this roller with the fixed guides 13 during the course of the travel of the conveyer serves to force the clamp 19 toward the plate 9, and so grasp a can tightly between them. In order to separate these two clamps the moment the roller leaves the guide 13 and release the can, a short guide 13ª is adapted to be engaged by the inner edge of this roller.

In each hollow projection 11 is arranged a hollow plunger-rod 16, having the plunger-valve 17 and a port 18. By means of the spring 19 the plunger 17 is ordinarily held tight against the inner face of the clamp 10. Through this valve mechanism air under pressure is admitted to the can by the following means: Secured upon the shaft 19' of the forward set of sprockets 2 is the air-reservoir 20. The shaft 19' is hollow and has suitable openings into said reservoir. The end of the shaft connects by any suitable means with a source of supply, whereby a constant pressure is maintained in the reservoir. Upon the periphery of this reservoir or drum I provide a number of couplings corresponding to the clamp-spaces on the sprockets and arranged in line with the rods 16 of said clamps as the latter come upon the sprockets. These couplings consist of a hollow cylinder 21, secured to the drum and having a port 22 opening into the interior of the drum. Slidable in this cylinder is the hollow rod 23, having a port 24. The inner end of this rod is adapted to engage the end of the rod 16 to form a continuous air-passage with the latter. The other or outer end is provided with a roller 26, which is in continuous engagement with the fixed guide or cam 27 during the revolution of the drum. This serves to force the rod 23 into contact with rod 16, and the continued pressure causes the latter also to move inwardly through the opening in the can. This movement of the two rods brings the port 24 into communication with the air within the drum and the port 18 into communication with the can-chamber. Consequently an open passage between the drum and the can is formed, and the latter is filled with compressed air. The guide 27 then causes the rod 23 to be retracted and drawn out of contact with the clampers, allowing the plunger 17 to close the passage to the can-chamber and the carrier to pass, with the can thus filled with compressed air, on into the submerging-trough 3. An operator determines by the rise of any bubbles to the surface the presence of any imperfect cans. In case such a can is discovered it is desired to prevent that can from being discharged with the perfect cans, whereby all trace of it would be lost. I have devised the following means to hold such imperfect cans in the conveyer and automatically to deliver them separate from the perfect cans: Upon a rod of each link of the conveyer is snugly but turnably clamped or secured the lever or hook 28 in such manner as to remain at any angle to which it may be turned. This lever has a longer or hook arm fitting the periphery of the can and a shorter arm which serves as a handle by which the lever is turned. When the conveyer is traveling on its upper horizontal line preparatory to and immediately following the receipt of a can, the handle portion of this lever will extend downwardly and the hook portion will project upwardly and forward so as not to interfere with the entrance of a can into the clamps. As the cans pass through the trough and the operator discovers a leak he immediately throws the handle of the hook, which now projects upward, so that the hook encircles the can. This hook is so curved that it will retain a can in the clamps even after they have been released by the roller 12 leaving the guide 13. The moment said guide terminates the clamps are allowed to move apart and the perfect cans drop into a suitable discharge-chute 29, whence they are conveyed away as desired. The leaky cans, however, are retained by means of the hooks 28 until the handles of these hooks engage a bar or stop 30, when the hooks are turned on their fulcrums, and the cans are then discharged into the second chute 31 separate from the perfect cans.

Having thus described my invention, what I claim as new, and desire to secure by Letters Patent, is—

1. The combination in a can-testing machine of a supporting-framework, sprockets journaled therein, and an endless conveyer passing around the sprockets and including links and pivot-rods therefor, clamps upon said conveyer between which the cans to be tested are held, a liquid-containing trough through which the conveyer passes during a portion of its travel, means by which the cans are filled with compressed air, a hook-lever turnably mounted upon a pivot-rod of each link and adapted to remain at any angle to which it may be turned said lever having a hook-arm fitting the periphery of the can and a shorter arm which serves as a handle by which the lever is turned, and means for automatically tipping the said levers to cause them to release an imperfect can.

2. The combination in a can-testing machine, of an endless conveyer and a support therefor, said conveyer including links and pivoted rods therefor, hook-levers secured to said pivot-rods and frictionally held in any position to which they may be turned said levers each including a long arm curved to embrace the can-body and a shorter arm which serves as an operating-lever whereby the longer arm is caused to engage and hold an imperfect can after the clamps have been released, and means engaging the short arm of the lever and releasing said imperfect can.

3. The combination in a can-testing machine of a support, an endless conveyer including links and pivot-pins therefor, and clamps between which the cans to be tested are held, one of said clamps movable in relation to the other, said movable clamp having a horizontal hollow projection with a lateral projection, a guide for said projection, adapted to move said movable clamp toward its companion member, a plunger movable in the hollow projection of the movable clamp, and provided with a valve, an air-reservoir, couplings including cylinders on the air-reservoir and provided with ports, and slidable rods having ports to aline with those in the cylinders, and means for operating said rods to establish communication with the reservoir and with the hollow projection.

4. The combination in a can-testing machine of a support, an endless conveyer having clamps between which the cans to be tested are held, a revoluble air-reservoir having a hollow cylinder secured to its periphery and provided with a port which communicates with the reservoir, a hollow rod slidable horizontally in the cylinder and provided with a port to be alined with the port in the cylinder, a hollow rod carried by one of said clamp members and adapted to be alined with the said slidable rod, and provided with a port, means whereby the slidable rod is operated to establish communication between itself and the other hollow rod, and a liquid-containing trough through which the conveyer passes.

5. In a can-testing machine, a horizontal endless conveyer consisting of links and pivot-rods therefor, adjustable clamps for the cans, hook-levers frictionally mounted on the pivot-rods of the links and including curved members to embrace imperfect cans and an operating-handle, and curved arms also mounted on said pivot-rods and adapted to support the cans from below, and means whereby said arms are axially adjustable upon said rods.

6. In a can-testing machine, the combination with an endless conveyer having a fixed plate thereon, a second plate slidable in relation to the first and between which the cans are adapted to be received and held, an air-passage in said slidable plates, and a valve in said passage; of an air reservoir or drum upon the shaft of one of the sprockets carrying said conveyer, and revoluble in unison with said sprockets, couplings upon the periphery of said drum, and means whereby said couplings are made to engage with the slidable members of said clamps to open said valves and admit air into the cans.

7. In a can-testing machine, the combination with an endless conveyer having clamp members thereon between which the cans are received, guides by which said members are engaged and forced toward each other to grasp and hold the can, one of said members having a hollow extension, a valve therein; of an air reservoir or drum revoluble in relation to the movement of said conveyer, couplings upon the periphery of said drum, said couplings consisting of a hollow cylinder, a port connecting said cylinder and the interior of said drum, a hollow piston-rod slidable in said cylinder having a port normally out of register with said cylinder-port, and means whereby said piston-rod may be made to engage the aforesaid valve in the clamp members, and so allow air under pressure to pass from the drum to the interior of the can.

8. The combination in a can-testing machine with an endless conveyer having clamp members between which the can is received and held, of a revoluble air reservoir or drum, hollow cylinders upon the periphery of said drum, a hollow rod slidable in each of said cylinders, ports through said rod and cylinder, a female coupling upon one end of said rod, a male coupling upon the adjacent clamp member, communication through said member with the interior of the can, a roller upon the other end of said rod, a cam-guide with which said roller is adapted to engage whereby said last-named clamp member and said rod are brought into engagement and air under pressure admitted from said drum to the interior of the can, and means whereby such engagement is automatically broken and the air under pressure retained in said can.

9. The combination in a can-testing machine of an endless conveyer, clamps thereon between which the cans are adapted to be received and held, means including an air-reservoir and two hollow rods adapted to be alined and provided with air-passages one of said rods having a valve disposed in a clamp member and the other rod adapted to open said valve by which air under pressure is admitted to the cans, a liquid-containing trough through which the cans are passed, a hook-lever upon said conveyer by which said cans may be engaged and held after the pressure of the clamps has been released, and means whereby said hook may be turned automatically to release such cans so engaged.

10. The combination in a can-testing machine, of an endless-chain carrier, rollers upon the ends of the axles of the links of said chain, sprockets over which said carrier passes, tracks upon which said rollers are supported, clamps upon this carrier between which the cans are adapted to be received, guides by which these clamps are operated to engage and hold the cans, an air reservoir or drum upon the shaft of one of said sprockets and revoluble in unison therewith, means including two rods adapted to be alined and provided with air-passages one of said rods having a valve located in one of the clamp members and adapted to be opened by the other rod whereby air under pressure is admitted from said drum into the cans, a liquid-containing trough through which said carrier passes with the cans thus charged, pivoted hook-levers whereby a can may be engaged and held in the carrier after the pressure of the clamps has been relaxed, and means whereby the cans so held by the hooks are delivered separate from the others.

In witness whereof I have hereunto set my hand.

WILMER S. CASE.

Witnesses:
   S. H. NOURSE,
   JESSIE C. BRODIE.